United States Patent
Mendoza

[15] 3,654,433
[45] Apr. 4, 1972

[54] DIFFERENTIAL CHANGE REGISTER

[72] Inventor: Phyllis E. Mendoza, 208 Anza Vista Ave., San Francisco, Calif. 94118

[22] Filed: Sept. 24, 1969

[21] Appl. No.: 860,573

[52] U.S. Cl. ............................................. 235/7 A, 109/1 R
[51] Int. Cl. ..................................... E05g 1/00, G06c 29/00
[58] Field of Search ................. 235/7.1, 7.11, 22, 130, 57, 235/1.6; 109/46, 1; 232/15, 16

[56] References Cited

UNITED STATES PATENTS

| | | |
|---|---|---|
| 1,553,694 | 9/1925 | Johnson et al. ........................... 109/1 |
| 1,696,522 | 12/1928 | Clegg et al. ............................. 109/46 |
| 2,170,362 | 8/1939 | Zoub ....................................... 109/46 |
| 3,146,944 | 9/1964 | Grippi, Jr. ............................ 235/98 C |

*Primary Examiner*—Stephen J. Tomsky
*Attorney*—Gregg & Hendricson

[57] ABSTRACT

Apparatus for registering payment received, payment owed and indicating the change difference. The apparatus includes a locked receptacle for deposit of payments received and a change unit for payment of change difference. The change unit is openable for each transaction, while the receptacle is of the vault type adapted for permanent attachment to the floor or the like and which cannot be opened by a cashier operating the apparatus.

7 Claims, 4 Drawing Figures

PATENTED APR 4 1972　　3,654,433

INVENTOR
PHYLLIS E. MENDOZA
BY Gregg & Hendricson
ATTORNEYS

DIFFERENTIAL CHANGE REGISTER

BACKGROUND OF INVENTION

In the sale of goods or services, as for example in stores, restaurants and the like, it is conventional to employ a cash register into which payments received are placed and from which change is returned. Numerous improvements have been made in cash register apparatus so that many cash registers now imprint the sale amount on a sales slip or the like and upon registration of the amount received will visually indicate the change to be returned. At least in certain fields of endeavor there have been found various difficulties in the use of this type of cash register. One difficulty is found in the possibility of peculations by those operating the registers and another difficulty lies in the large amount of money that may be accumulated in the register. This large amount of money, which increases as sales progress, may tempt robbery and also provide a large monetary fund from which a relatively small percentage of money may be missing at the end of a day or shift, owing perhaps to improper operations. While a small percentage error tends to be accepted or overlooked, the amount of money involved in the error may be substantial. The present invention overcomes these above-noted difficulties as well as others associated with conventional cash registers and their operation.

SUMMARY OF INVENTION

There is provided by this invention a differential change register as a substitute for a cash register and adapted to be employed by a cashier or the like in the field of retail sales, such as in stores or restaurants. The register hereof includes a simple subtraction unit producing a visible indication of entries and result, together with a change drawer and a locked receptacle having an opening for the deposit of monies received. The change drawer of the register is provided solely for the purpose of making change during a sales transaction and no monies are placed in the change drawer during such transactions. Quite to the contrary, the invention provides for the deposit of money received into the locked receptacle which is preferably adapted for substantially permanent attachment to a floor or the like so as to make the money received normally inaccessible to any other than an owner or one empowered to periodically open the receptacle.

In use of the invention, the drawer or the change receptacle is initially provided with a predetermined amount of change which is then successively depleted as sales transactions are consummated. This, then provides a minimal amount of money in the register at all times and particularly at the termination of a shift or period of operations so that any discrepancy in the amount of money remaining in the change drawer from that that should be there is very apparent and in fact would constitute a substantial percentage of the remaining money. This, by its very nature, militates against peculations by one operating the register for any discrepancy in the resultant amount in the register is so obvious as to immediately call attention to some type of improper operation.

It is additionally provided by the present invention that the money paid by a customer to the cashier shall be deposited in the locked receptacle associated with the subtraction unit and change drawer of the overall differential change register. Consequently even in situations wherein a large dollar volume of sales occur the money representing this dollar volume is at all times retained within a locked receptacle so as to be wholly unavailable either to the cashier or to one that might attempt to steal from or rob the register. This then is a substantial deterrent to would-be thieves or robbers for the maximum amount of money is placed in the change drawer at the beginning of operations and this amount steadily decreases as sales transactions occur.

The invention may also be provided with means for retaining bills received from customers in a position to be viewed throughout the change making operation to overcome possible difficulties which could arise through a misunderstanding as to the value of the bill presented the cashier by the customer. Furthermore, the invention may be provided with interlock means so as to only actuate the change drawer for opening same upon deposit of the customer's money in the locked receptacle or in some entryway thereto. Preferably a counter is associated with the entry slot of the locked receptacle to be activated by each passage of money therethrough as account of sales transactions. This provides an owner or manager with a further check on the overall operation of receiving money for goods or services sold or rendered.

The invention is generally applicable to situations wherein money is received and the transactions require provision of change. The invention is, however, particularly suited to retail food and beverage sale as, for example, in a restaurant or the like and thus the following description is at least in part reference to this application of the invention.

DESCRIPTION OF FIGURES

The present invention is illustrated as to a particular preferred embodiment thereof in the accompanying drawing wherein.

DESCRIPTION OF PREFERRED EMBODIMENT

Figure 1:
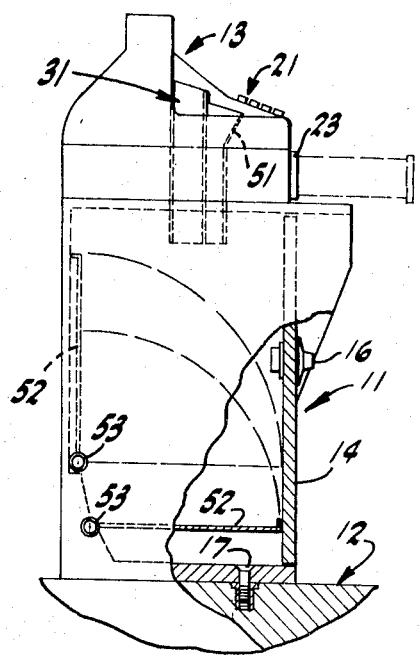
FIG. 1 is a side elevational view of a differential change register in accordance with the present invention and having portions broken away as indicated.
Figure 2:
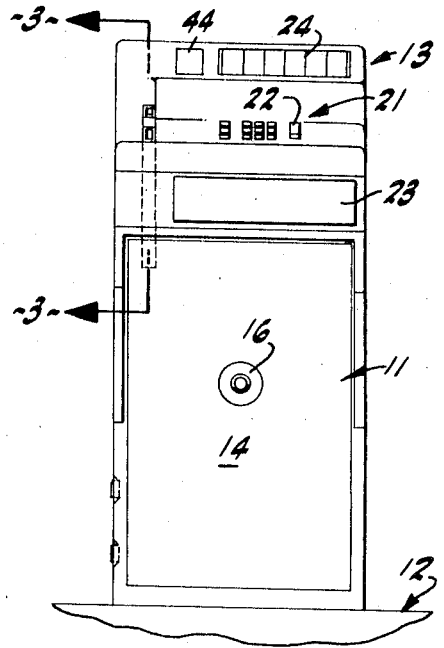
FIG. 2 is a rear elevational view of the register of FIG. 1.
Figure 3:
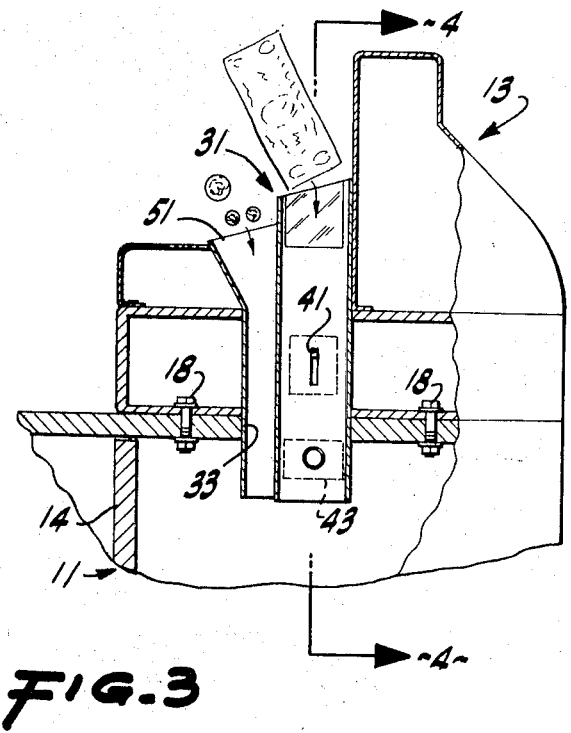
FIG. 3 is a partial sectional view taken in the plane 3—3 of FIG. 2.
Figure 4:
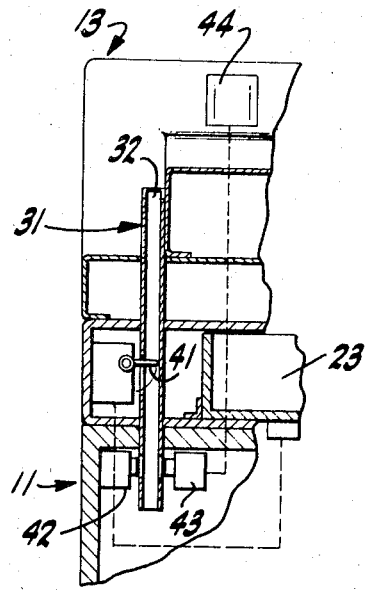
FIG. 4 is a partial sectional view taken in the plane 4—4 of FIG. 3.

Considering now a preferred embodiment of the present invention and referring to the drawing, there will be seen to be provided a receptacle 11 preferably adapted for mounting upon a floor or the like 12 and carrying atop same a register 13. The receptacle 11 is provided in the form of a safe, vault or the like which is substantially impregnable to unauthorized access. To this end the receptacle may be formed of fairly strong metal walls having a door 14 which may, for example, be closed by a combination lock 16. As stated above, this receptacle is intended to be normally locked so as to provide a safe repository for money that is inaccessible to those operating the present invention and to unauthorized persons such as, for example, thieves, robbers and the like. To this end the receptacle may additionally be firmly secured to or through a floor, as for example, by bolts 17 as shown.

The register 13 is disposed atop the receptacle 11 and preferably firmly secured thereto as, for example, by bolts 18. This register is primarily comprised as a small subtracting unit having a keyboard 21 by means of which an operator may enter numbers into the unit and including a totalizer or subtracting key 22 by means of which the operator may subtract one entered number from another. The register also includes a cash or change drawer 23 which is movable between a closed and open position as illustrated in FIG. 1 so as to provide for controlled access to the interior thereof.

The register 13 may be provided with any of a variety of different change or cash receptacles having access means. Thus for example, the "drawer" 23 may be provided as a locked casette initially loaded at some other location such as a bank and unlocked as by insertion in the register 13. Numerous different physical configurations are possible in this respect.

As a further portion of the register 13 there is preferably provided a visual indicator 24 including a window through which there is visible the numbers entered on the keyboard 21 and also the total from subtraction operations accomplished by the totalizer key 22. The subtraction unit itself may be quite conventional and also the operation of the visual indicator 24 may be conventional. Furthermore, the arrangement of the keyboard may be extremely simple if desired for it is only necessary to provide ten keys thereon in addition to a totalizer key and possibly an erase key. Thus the normal bulk and complexity of the conventional cash register is precluded hereby.

As a further and important portion of the present invention there is provided a receiver 31 which may, as illustrated, include a pair of spaced, upstanding, transparent walls atop the register 13 and defining therebetween a slot 32. Interiorly of the register the walls continue the slot 32 downwardly therethrough into communication with a small opening 33 through the top of the receptacle 11. This receiver 31 and more particularly the slot 32 thereof is provided for the purpose of depositing money in the receptacle so that it then becomes wholly unavailable to the operator of the invention.

Before proceeding with a description of further portions of the invention it is of interest to briefly indicate operation of the invention. A cashier or other person operates the invention to handle money received during sales transactions. Consider, for example, a restaurant wherein a restaurant check or bill shows the total amount owed by the patron. Such a restaurant check together with a patron's payment is provided to the operator and in many instances the payment is in excess of the check so that change is required to be returned to the patron. The present invention is particularly directed to receipt of the payment and return of the change. Payment received as, for example, a bill of some denomination larger than the amount owed is placed in the receiver 31 and the denomination of this bill is entered on the keyboard 21. The amount of the restaurant check is then also entered on the keyboard 21 so that by then depressing the totalizer key 22 a subtraction occurs and the correct change to be returned is indicated at the indicator 24. This totalizer key may be employed to open the change drawer 23 so that the operator may then remove from the change drawer the correct change and return it to the patron. The money received from the patron is not placed in the change drawer but instead is placed in the receiver 31 so as to thus pass through the slot 32 and fall into the locked receptacle 11. Consequently the operator or cashier does not have access to monies received from patrons except in the initial step of receiving the money and placing it in the receiver.

With the foregoing brief description of operation in mind it is noted that there may be provided further portions of the present invention improving this operation and covering various contingencies that may possibly arise during the transaction. Thus, for example, there may be provided a controllable gate 41 having an arm or plate extending across the receiver slot 32 so that upon insertion of money in the form of a bill, for example, in the receiver 31 such bill will initially be prevented from falling through the slot 32. Instead the bill will be retained between the above-noted transparent plates 31 so that at least a corner thereof is visible. Although the bill in this latter position is not available to be removed from the invention, it is sufficiently visible that it is possible to verify the amount thereof. Thus under those circumstances wherein a customer may, for example, contend that he has paid his restaurant check with a larger bill than that entered on the keyboard it is possible to merely view the bill to preclude misunderstandings on this point. The gate 41 may for example, be electrically or mechanically operated to open the slot 32 so that a bill will drop into the receptacle 11. In this latter respect it is, for example, possible to arrange the gate control so that the gate 41 will open when the change drawer 23 is closed, terminating the transaction.

In addition to the foregoing there is preferably provided as a portion of the present invention means for detecting and recording the passage of money as in the form of bills through the slot 32 into the receptacle 11. Such means may, for example, be provided in the form of a light source 42 and photo cell or light responsive means 43 disposed on opposite sides of the slot 32 as, for example, within the receptacle 11. These means for detecting the passage of bills or the like into the receptacle preferably are connected to operate a counter 44 that may, for example, be located for viewing at the keyboard 21 of the register 13. While this portion of the apparatus may be employed only to operate a counter for recording the number of transactions occuring it is also possible to utilize this portion of the present invention as a release for the change drawer 23. At least under certain conditions of operation of the present invention it may be desirable to additionally guard against improper operation of the invention by a cashier or the like. In this circumstance the output of the photodetector 43 may trigger release mechanism for the change drawer 23 so that only upon passage of some piece of paper such as a bill through the slot 32 will it be possible for the change drawer to open, even after the totalizer key 22 is actuated.

The differential change register hereof is also preferably provided with a separate coin slot 51 extending from atop the unit into the interior of the receptacle 11. This slot may be formed with the receiver 31 and having an enlarged top opening for ready reception of coins as may be included in a payment received. This prevents the counter from being actuated by coins otherwise dropped in the bill slot 32. Within the receptacle 11 there are also provided means for separating monies received during successive periods of operation. Such means are shown as pivotally mounted plates 52 adapted to pivot between vertical and horizontal positions at different levels in the receptacle. The mounting of these plates may be quite simple with the plates extending entirely across the interior of the receptacle interior so as to fully close off the volume below each plate as it is pivoted into a horizontal position. A key lock 53 may be provided for each plate in extension outside of the receptacle so that the plate movement is under control of a manager, for example. Thus the invention provides for separating receipts from successive shifts as a further check upon accuracy and honesty of operation.

Considering further the operation of the present invention, it is noted that basically the change register 13 is adapted to originally contain in the cash drawer 23 thereof an amount of money in the form of various denominations of bills and coins which will suffice to make change for the number of sales transactions occurring during some predetermined time such as an 8 hour shift of operation. As each sale is consummated and change made therefor, the monies paid to the cashier by the customer or possibly a waiter or sales person on his behalf, is placed in the receiver 31 so as to be deposited in the receptacle 11. For each transaction the amount of change owed the customer appears at the indicator 24 and the operator or cashier then removes this amount of money from the change drawer 23 as it opens. At no time is any money received from a sale deposited in the change drawer, but instead it is deposited only in the locked receptacle 11. Consequently receipts from sales are not subject either to peculation or robbery. The operator or cashier is not provided with the capability of opening the receptacle 11 and only an owner or manager or the like can open the receptacle door 14 to remove receipts from the receptacle.

The locked receptacle 11 will be seen to semi-permanently retain monies deposited therein during sales transactions and to consequently prevent access to this money. The unit 13 associated with the receptacle may be quite simple and relatively conventional in structure insofar as the subtraction portion thereof is concerned but does include the above-described receiver 31 and counter 44. The normal complexities of cash registers is not included herein. Furthermore, many of the difficulties normally encountered with cash registers is entirely precluded by the present invention. At no time during operation of the present invention can there be found in the change drawer 23 an amount of money greater than that originally placed therein. As stated above, this then at least psychologically militates against peculations by cashiers or the like using the present invention. The rather small amount of money remaining in the change drawer 23 at the end of the day's transactions would immediately call attention to a monetary discrepancy of even $10.00 or so for such would presumably constitute a substantial percentage of the money remaining in the drawer. Furthermore, the enticement to one contemplating robbery or theft is materially minimized hereby inasmuch as the majority of money at the present invention is located within the locked receptacle so as to be wholly unavailable for removal.

It is to be appreciated that various conventional prior art mechanisms and procedures are also useable with the present invention. As for example, the register 13 may be constituted to provide a day's total receipts as well as total monies registered as paid by patrons and change paid out. This then simplifies the task of an owner or the like in verifying the amount of money received with the checks paid and change expended.

While the present invention has been described with respect to a single preferred embodiment thereof, it is to be understood that numerous variations in the illustrated embodiment are possible and thus reference is made to the appended claims for a definition of the invention.

I claim:
1. A differential change register comprising,
   a lockable receptacle,
   a register having a keyboard and a change drawer mounted atop said receptacle, said register including subtracting means for subtracting numbers entered by operation of said keyboard and indicating means visually indicating the results of said subtraction, and
   means defining at least one slot extending through said register from the outside thereof into said receptacle for the direct passage of money therethrough into said receptacle.
2. The differential change register of claim 1 further defined by counting means cooperating with said slot defining means and including an indicator showing the cumulative number of elements passing through said slot.
3. The differential change register of claim 1 further defined by said slot-defining means including at least one partially transparent wall extending upwardly from said receptacle in view from the exterior thereof, and gate means retaining currency placed in the slot adjacent said transparent wall until released to drop into said receptacle, whereby said currency is retained in sight during a change-making transaction involving same.
4. The differential change register of claim 1 further defined by said receptacle comprising a safe having a combination lock door and being adapted for attachment to a floor or the like whereby the contents thereof are substantially unavailable to all but those having knowledge of the combination of said lock.
5. The differential change register of claim 1 further defined by said register having a totalizer key producing upon actuation a total of said subtraction and also opening said change drawer.
6. The differential change register of claim 1 further defined by said receptacle having movable partitions for controllably closing off successive volumes thereof by control means extending exteriorly of the receptacle for separating monies deposited therein at controlled times.
7. A differential change register comprising
   a normally locked receptacle,
   a register having a keyboard and a change drawer opened by a totalizer key on said keyboard and being mounted atop said receptacle,
   means defining a slot extending from the exterior of said register directly into said receptacle for the passage of money received into the receptacle, and
   counting means cooperating with the means defining a slot and including an indicator visually indicating the number of elements passing through said slot into said receptacle.

* * * * *